US009659161B2

(12) United States Patent
Nakao

(10) Patent No.: US 9,659,161 B2
(45) Date of Patent: May 23, 2017

(54) AUTHENTICATION MANAGEMENT SYSTEM, AUTHENTICATION MANAGEMENT APPARATUS, AUTHENTICATION METHOD, AND STORAGE MEDIUM

(71) Applicant: Kenta Nakao, Tokyo (JP)

(72) Inventor: Kenta Nakao, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 170 days.

(21) Appl. No.: 14/523,259

(22) Filed: Oct. 24, 2014

(65) Prior Publication Data

US 2015/0128256 A1   May 7, 2015

(30) Foreign Application Priority Data

Nov. 6, 2013 (JP) .................................. 2013-230204

(51) Int. Cl.
*G06F 21/35* (2013.01)
*G06F 21/60* (2013.01)
(Continued)

(52) U.S. Cl.
CPC ............ *G06F 21/35* (2013.01); *G06F 21/608* (2013.01); *G06F 21/6272* (2013.01); *H04L 63/0853* (2013.01); *H04L 63/107* (2013.01)

(58) Field of Classification Search
CPC ....... H04W 4/02; H04W 4/025; H04W 4/008; H04W 12/06; H04W 12/08; H04L 63/107;
(Continued)

(56) References Cited

U.S. PATENT DOCUMENTS 7,350,230 B2 *   3/2008   Forrest ................... G06Q 20/32
705/67
7,496,948 B1 *   2/2009   Hamilton, II ........... F16P 3/147
340/539.1

(Continued)

FOREIGN PATENT DOCUMENTS

JP   2012-119003   6/2012

*Primary Examiner* — Tae Kim
(74) *Attorney, Agent, or Firm* — Oblon, McClelland, Maier & Neustadt, L.L.P.

(57) ABSTRACT

An authentication management system for managing use of a processing apparatus includes an authentication management apparatus including a position storing unit to store position information of the processing apparatus; a receiving unit to receive user information that identifies a portable terminal to be used for authenticating when a user requests the processing apparatus via a requester to perform a target process; a determination unit to determine whether distance between the portable terminal and the processing apparatus satisfies a proximity determination condition between the portable terminal and the processing apparatus, the distance being obtained based on position information of the portable terminal received from the portable terminal, and the position information of the processing apparatus; and an authentication unit to conduct authentication processing based on user information received from the requester, and the user information received from the portable terminal when the distance satisfies the proximity determination condition.

11 Claims, 11 Drawing Sheets

(51) Int. Cl.
*H04L 29/06* (2006.01)
*G06F 21/62* (2013.01)

(58) Field of Classification Search
CPC . H04L 63/0853; H04L 63/0876; H04L 63/10; H04L 63/105
See application file for complete search history.

(56) References Cited

U.S. PATENT DOCUMENTS

| | | | | |
|---|---|---|---|---|
| 8,321,913 B2* | 11/2012 | Turnbull | ............ | H04L 63/0492 726/2 |
| 8,646,060 B1* | 2/2014 | Ben Ayed | ........... | H04L 63/0853 726/9 |
| 2003/0217137 A1* | 11/2003 | Roese | ........................ | G01S 5/02 709/223 |
| 2004/0124966 A1* | 7/2004 | Forrest | ................... | G06Q 20/32 340/5.8 |
| 2004/0250074 A1* | 12/2004 | Kilian-Kehr | ............ | G06F 21/35 713/172 |
| 2006/0294388 A1* | 12/2006 | Abraham | .............. | G06F 21/305 713/182 |
| 2007/0136796 A1* | 6/2007 | Sanchez | .............. | H04L 63/0853 726/5 |
| 2008/0209521 A1* | 8/2008 | Malaney | ............. | H04L 63/0492 726/4 |
| 2008/0222701 A1* | 9/2008 | Saaranen | ............ | H04L 63/0492 726/3 |
| 2009/0254975 A1* | 10/2009 | Turnbull | ............. | H04L 63/0492 726/3 |
| 2009/0265775 A1* | 10/2009 | Wisely | ................ | H04L 63/0492 726/9 |
| 2010/0169949 A1* | 7/2010 | Rothman | ................ | G06F 21/35 726/1 |
| 2010/0317323 A1* | 12/2010 | Facemire | ............ | H04L 63/0492 455/411 |
| 2011/0215921 A1* | 9/2011 | Ben Ayed | ................ | G08B 1/08 340/539.11 |
| 2011/0252464 A1* | 10/2011 | Sanjeev | ................ | H04L 63/107 726/7 |
| 2011/0314539 A1* | 12/2011 | Horton | .................... | G06F 21/35 726/20 |
| 2012/0192252 A1* | 7/2012 | Kuo | ........................ | G06F 21/31 726/4 |
| 2012/0317615 A1* | 12/2012 | Geva | ........................ | G06F 21/31 726/3 |
| 2014/0245391 A1* | 8/2014 | Adenuga | ................ | G06F 21/34 726/3 |

\* cited by examiner

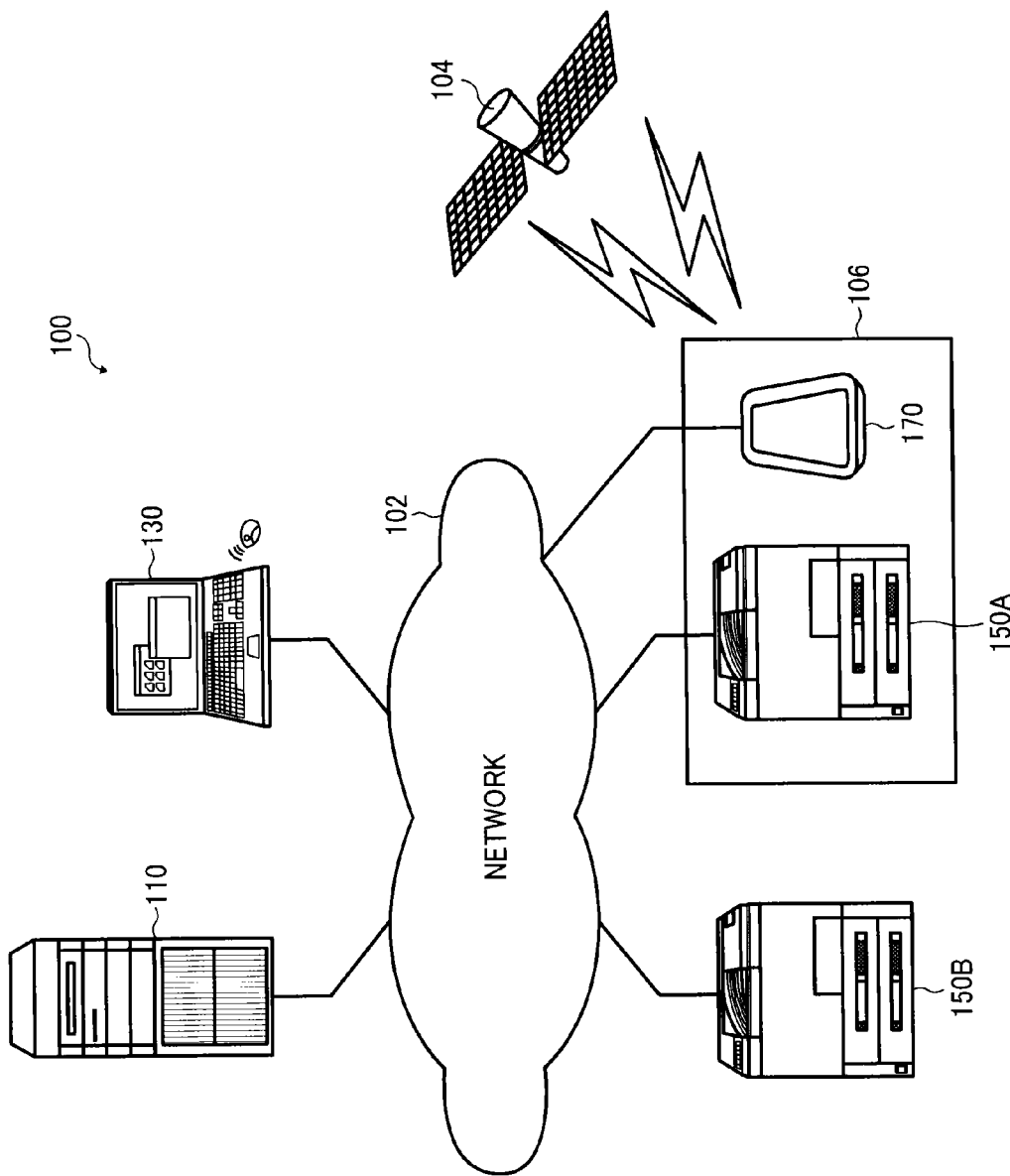

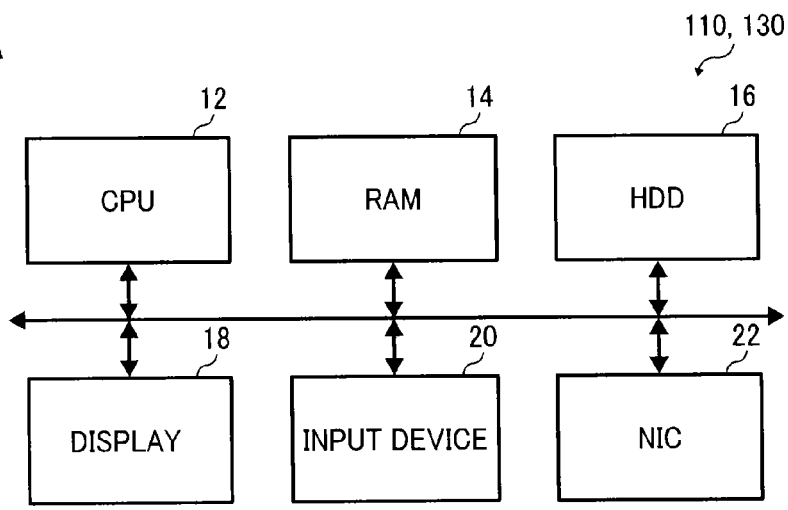
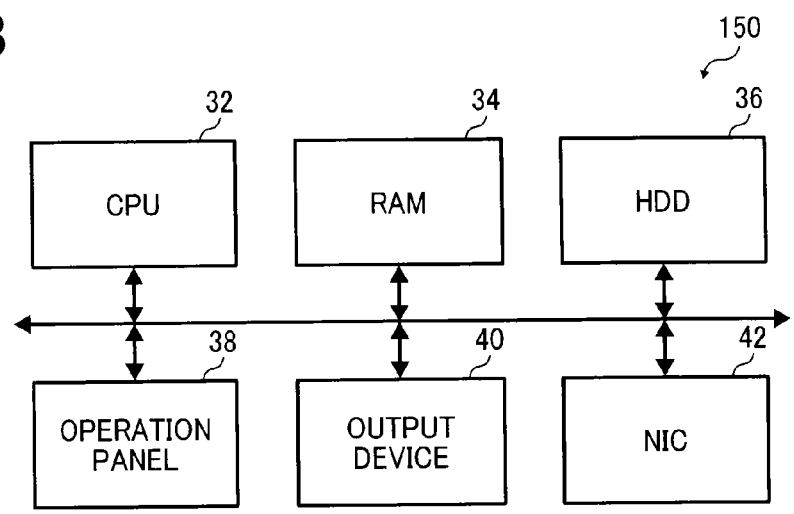
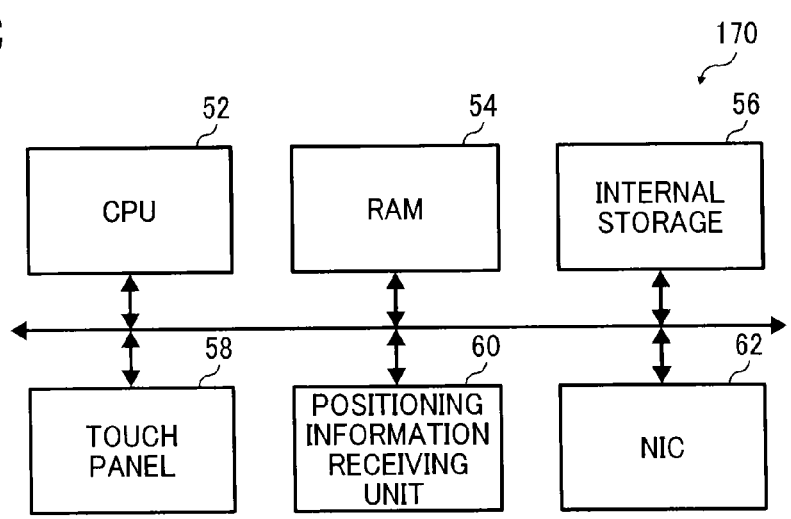

FIG. 4A

| NAME | PHYSICAL ADDRESS | IP ADDRESS | POSITION INFORMATION | AVAILABLE DRIVER |
|---|---|---|---|---|
| PRINTER 1 | XX-YY-ZZ-UU-VV-WW | xxx.xxx.xxx.xx1 | xxx.xxx1, yyy.yyy1 | ... |
| PRINTER 2 | GG-HH-II-JJ-KK-LL | xxx.xxx.xxx.xx2 | xxx.xxx2, yyy.yyy2 | ... |
| ... | ... | ... | ... | ... |

FIG. 4B

| PHYSICAL ADDRESS | IP ADDRESS | PROCESS CONTENTS (DRIVER SETTING INFORMATION...) | PRINT-DATA |
|---|---|---|---|
| XY-YZ-ZU-UV-VW-WX | xxx.xxx.xxx.1x1 | ... | ... |
| GH-HI-IJ-JK-KL-LG | xxx.xxx.xxx.1x2 | ... | ... |
| ... | ... | ... | ... |

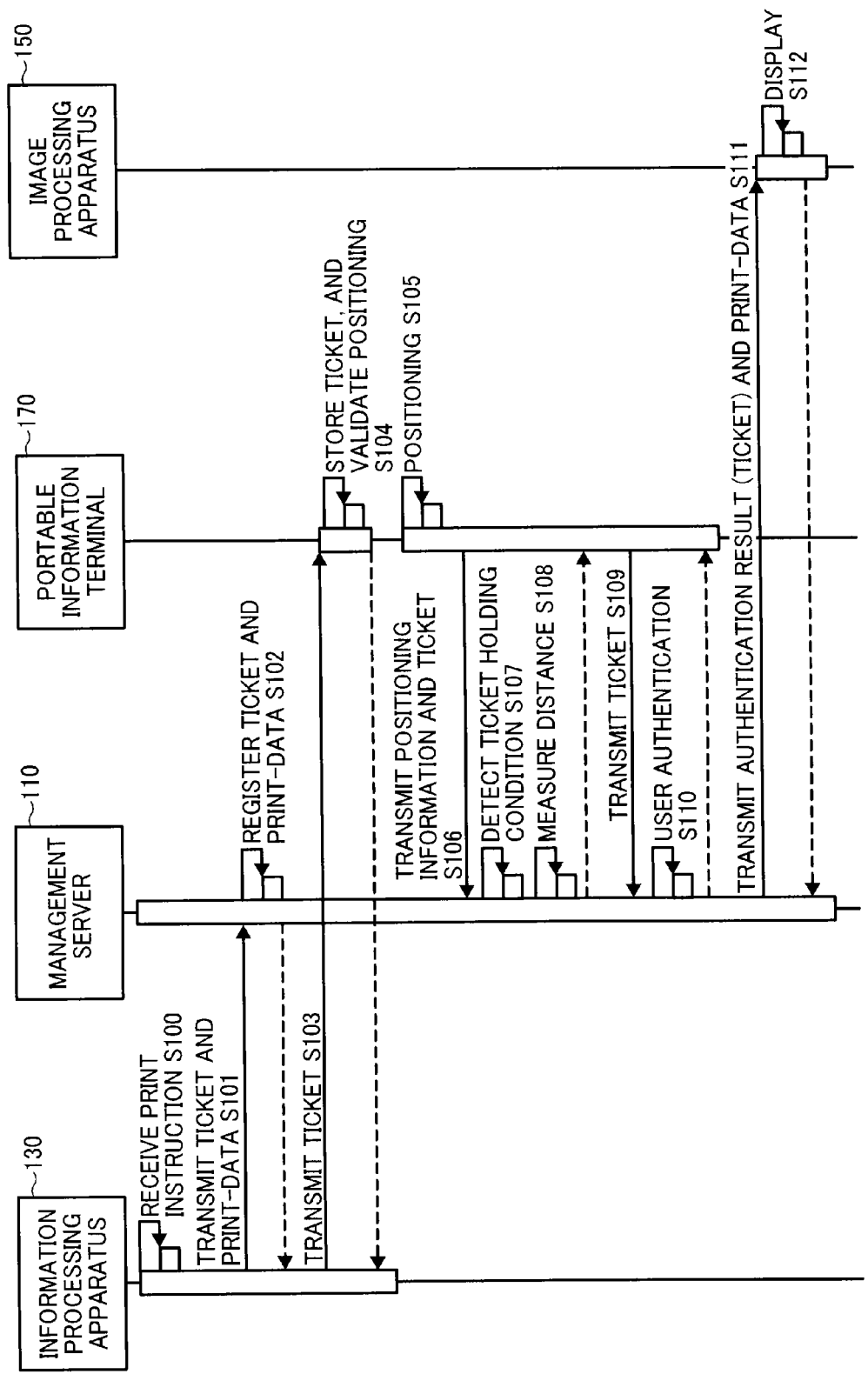

AUTHENTICATION MANAGEMENT SYSTEM, AUTHENTICATION MANAGEMENT APPARATUS, AUTHENTICATION METHOD, AND STORAGE MEDIUM

CROSS-REFERENCE TO RELATED APPLICATION

This application claims priority pursuant to 35 U.S.C. §119(a) to Japanese Patent Application Nos. 2013-230204, filed on Nov. 6, 2013 in the Japan Patent Office, the disclosure of which are incorporated by reference herein in their entirety.

BACKGROUND

Technical Field

The present invention relates to an authentication management system, and more particularly to an authentication management system, an authentication management apparatus, an authentication method, and a storage medium storing an authentication management program.

Background Art

In offices, image processing apparatus such as copiers, facsimile machines, and multi-functional peripherals (MFPs) are typically used by many users, and security measures for such image processing apparatuses shared by many users are demanded. For example, authentication of a user is checked using an integrated circuit (IC) card, password input by the user, or a terminal device operated by the user, and an access to image processing apparatuses is granted if the user authentication is successful.

SUMMARY

In one aspect of the present invention, an authentication management system for managing use of a processing apparatus by a user is devised. The authentication management system includes an authentication management apparatus including; a position storing unit to store position information of the processing apparatus; a receiving unit to receive user information that identifies a portable terminal to be used for authenticating the user, when the user requests the processing apparatus via a requester to perform a target process; a determination unit to determine whether distance between the portable terminal and the processing apparatus satisfies a proximity determination condition for determining proximity between the portable terminal and the processing apparatus, the distance being obtained based on position information of the portable terminal received from the portable terminal, and the position information of the processing apparatus; and an authentication unit to conduct authentication processing based on user information received from the requester of the target process, and the user information received from the portable terminal when the distance satisfies the proximity determination condition.

In another aspect of the present invention, an authentication management apparatus for managing use of a processing apparatus based on authentication using a portable terminal carriable by a user is devised. The authentication management apparatus includes a first storage unit to store position information of the processing apparatus; a second storage unit to store user information indicating the portable terminal used for authentication when conducting a target process requested from a requester; a determination unit to determine distance between the portable terminal and the processing apparatus based on position information of the portable terminal received from the portable terminal, and position information of the processing apparatus; and an authentication unit to conduct authentication processing based on the user information received from the requester of the target process, and the user information received from the portable terminal that satisfies a proximity determination condition when the distance satisfies the proximity determination condition used for determining proximity.

In another aspect of the present invention, an authentication method of managing use of a processing apparatus by a user is devised. The method includes the steps of receiving user information that identifies a portable terminal to be used for authenticating the user when the user requests the processing apparatus via a requester to perform a target process; obtaining distance between the portable terminal and the processing apparatus based on position information of the portable terminal received from the portable terminal, and position information of the processing apparatus; determining whether the distance between the portable terminal and the processing apparatus satisfies a proximity determination condition; and conducting authentication processing based on user information received from the requester of the target process, and the user information received from the portable terminal when the distance satisfies the proximity determination condition used for determining proximity.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 1 is a schematic configuration of a user authentication management system according to an example embodiment;

FIG. 2A is a hardware configuration of a management server and an information processing apparatus according to an example embodiment;

FIG. 2B is a hardware configuration of an image processing apparatus according to an example embodiment;

FIG. 2C is a hardware configuration of a portable information terminal according to an example embodiment;

FIG. 4A is a data structure of an image processing apparatus management table used for managing position information of image processing apparatuses;

FIG. 4B is a data structure of a print processing management table used for managing print processing;

FIG. 5 is a sequential chart of showing the steps of user authentication processing conducted by the authentication management system according to an example embodiment;

Figure 3:
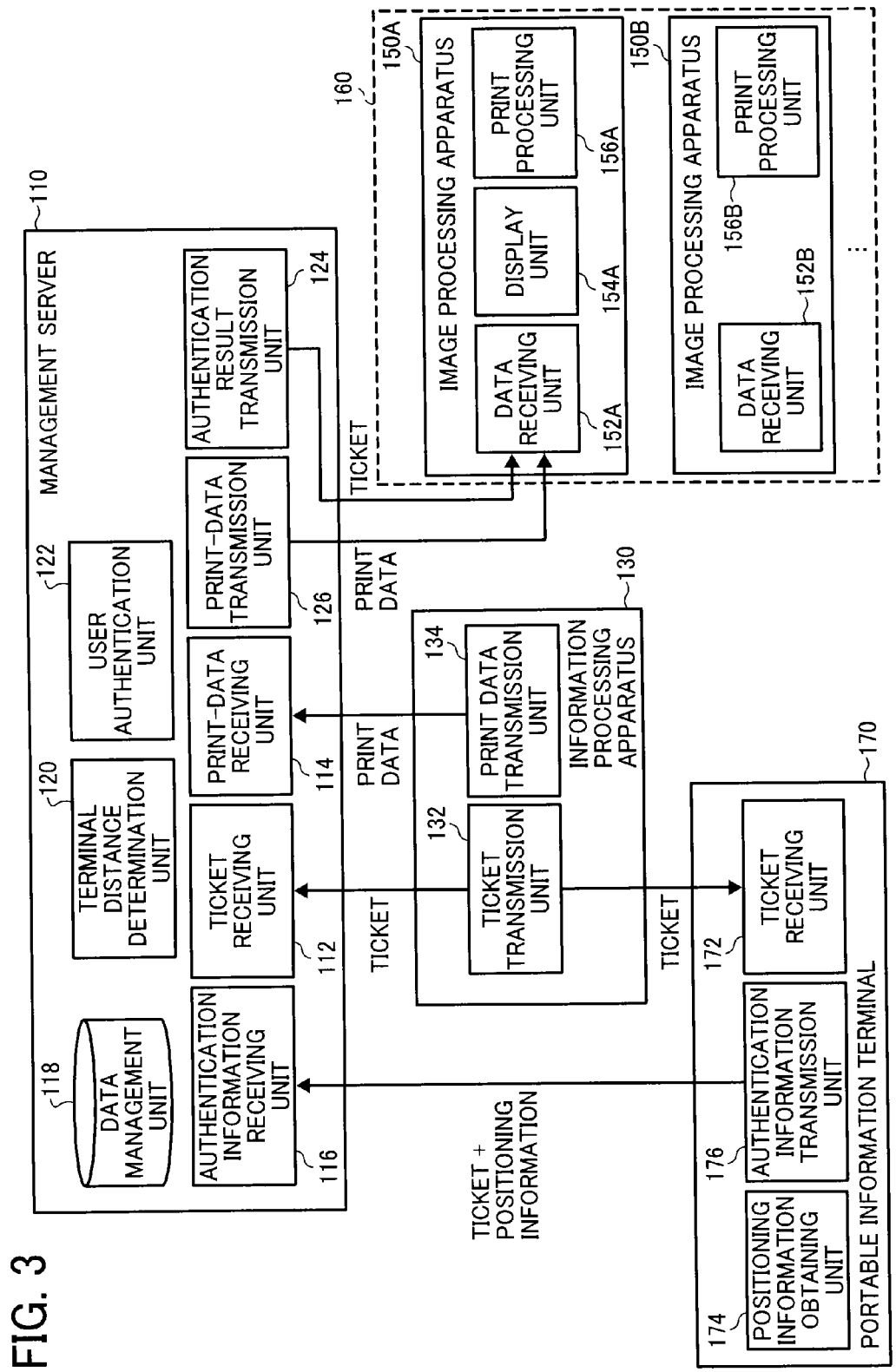
FIG. 3 is a functional block diagram of a user authentication management system according to an example embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views illustrated in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, an apparatus or system according to an example embodiment is described hereinafter.

A description is given of an authentication management system according to an example embodiment. It should be noted that an example embodiment is not limited to the following configuration. In this disclosure, a user authentication management system employs a portable information terminal for authentication, and a management server for managing use of an image processing apparatus.

(Configuration of User Authentication Management System)

FIG. 1 is a schematic configuration of a user authentication management system 100 according to an example embodiment. The user authentication management system 100 includes a management server 110, an information processing apparatus 130, image processing apparatuses 150A and 150B, and a portable information terminal 170 connectable with each other via a network 102. The network 102 is, for example, the Internet, wide area network (WAN), and local area network (LAN), and can be configured as a wired network, a wireless network, or a combination of wired network and wireless network.

The management server 110 is a server that manages use of one or more of the image processing apparatuses 150 disposed in the user authentication management system 100. The management server 110 starts user authentication based on information of position of the portable information terminal 170 carried by a user for a target process such as print processing requested by the user, and assists the user to conduct an output of print processing using a desired image processing apparatus. The management server 110 is typically a general computer such as a personal computer, a work station, a blade server or the like.

The information processing apparatus 130 is an apparatus used by a user when the user requests a target process such as print processing. When the information processing apparatus 130 receives an instruction of print processing from a user, the information processing apparatus 130 starts the print processing with the management server 110. The information processing apparatus 130 is, for example, a personal computer, a tablet computer, a smart phone, a personal digital assistance (PDA) or the like.

The portable information terminal 170, which can be carried by a user, can be used as a personal identification unit when conducting print processing requested by the user via the information processing apparatus 130. The portable information terminal 170 obtains positioning information (position information) using positioning technologies such as global positioning system (GPS), indoor message system (IMES), wireless fidelity (WiFi), ultra sonic wave, visible light communication, and autonomous navigation system. FIG. 1 illustrates a configuration using a GPS satellite 104 as a positioning technology. The obtained position information is transmitted to the management server 110, and user authentication processing can be initiated or started when a user carrying the portable information terminal 170 approaches within a given area around a desired image processing apparatus. In an example case of FIG. 1, an approach of user carrying the portable information terminal 170 to the image processing apparatus 150A disposed at location 106 is detected.

The portable information terminal 170 is, for example, a tablet computer, a smart phone, a personal digital assistance (PDA) or the like. In this example configuration, the information processing apparatus 130, used by a user for requesting print processing, and the portable information terminal 170, carried by the user and used for authentication, are different apparatuses, but the information processing apparatus 130 and the portable information terminal 170 can be the same one apparatus in other configuration.

The image processing apparatus 150 is a processing apparatus that conducts a target process such as print processing requested by a user when the user inputs the request by using the information processing apparatus 130. In a preferable configuration, the image processing apparatus 150 includes a display unit such as a liquid crystal display that can display contents of print processing requested by a user, and a list of apparatuses that can conduct the print processing, with which the user can select an apparatus that conducts the print processing from the list. The image processing apparatus 150 is typically a processing apparatus having capability of image processing such as a laser printer and a multi-functional peripherals. The laser printer is an image processing apparatus having capability of printing, and the multi-functional peripherals (MFP) is typically an image processing apparatus having capability of printing, copying, scanning, and facsimile.

(Hardware Configuration)

Before describing a user authentication processing according to an example embodiment, a description is given of a hardware configuration of the management server 110, the information processing apparatus 130, the image processing apparatus 150, and the portable information terminal 170 configuring the user authentication management system 100.

FIG. 2A is a hardware configuration of the management server 110 and the information processing apparatus 130 according to an example embodiment. As illustrated in FIG. 2A, each of the management server 110 and the information processing apparatus 130 includes, for example, a central processing unit (CPU) 12, a random access memory (RAM) 14, a hard disk drive (HDD) 16, a display 18, an input device 20, and a network interface card (NIC) 22, which can be connected with each other via a main bus.

The HDD 16 stores various control programs such as operating systems, applications, and printer drivers, and setting information. The display 18 is, for example, a liquid crystal display that displays a process result on a screen. For example, the display 18 displays print data, to be described later. The input device 20 is, for example, a key board and a mouse to receive various operations. The NIC 22 is an interface used for conducting communication between apparatuses connected by LAN.

The CPU 12 reads out various control programs stored in a read only memory (ROM) and the HDD 16, loads the various control programs on a working area provided by the RAM 14 to execute functions and processing to be described later.

FIG. 2B is a hardware configuration of the image processing apparatus 150 according to an example embodiment. As illustrated in FIG. 2B, the image processing apparatus 150 includes a CPU 32, a RAM 34, a HDD 36, an operation panel 38, an output device 40, and a NIC 42 connectable with each other via a main bus.

The HDD 36 stores various programs, and font data such as outline font data used for displaying various information. The operation panel 38 includes an input device such as hard keys and a touch panel operate-able by a user, and a display device such as a light emitting diode (LED) display device and a liquid crystal display. The operation panel 38 receives input of various setting information, and displays various information. The output device 40 is, for example, a plotter that conducts an instructed print processing to form an image on a sheet used as a transfer member. The NIC 42 is an interface used for conducting communication between apparatuses connected by LAN.

The CPU 32 reads out various programs stored in a read only memory (ROM) and the HDD 36, loads the various control programs on a working area provided by the RAM 34 to execute functions and processing to be described later.

FIG. 2C is a hardware configuration of the portable information terminal 170. As illustrated in FIG. 2C, the portable information terminal 170 includes a CPU 52, a RAM 54, an internal memory 56, a touch panel 58, a positioning information receiving unit 60, and a NIC 62 connectable with each other via a main bus.

The internal memory 56 stores various programs and setting information. The touch panel 58 is disposed when the portable information terminal 170 is a smart phone and a tablet or the like. The touch panel 58 receives an input from a user, and displays a process result on a screen. The positioning information receiving unit 60 receives positioning information using the above mentioned positioning technologies. The positioning information receiving unit 60 has an antenna that can receive a positioning signal such as GPS and IMES to receive positioning information included in the positioning signal. The NIC 62 is an interface used for conducting communication between apparatuses connected by LAN.

The CPU 52 reads out programs stored in a read only memory (ROM) and the internal memory 56, loads the various control programs on a working area provided by the RAM 54 to execute functions and processing to be described later.

(Functional Configuration)

A description is given of a functional configuration of the user authentication management system 100 with reference to FIGS. 3 and 4. FIG. 3 is a functional block diagram configurable in the user authentication management system 100 according to an example embodiment. FIG. 3 shows components 112 to 126 operated on the management server 110, components 132 and 134 operated on the information processing apparatus 130, components 152 to 156 operated on the image processing apparatus 150, and components 172 to 176 operated on the portable information terminal 170.

A description is given of the information processing apparatus 130, which can be used to request a target process such as print processing and to start the print processing with the management server 110. As illustrated in FIG. 3, the information processing apparatus 130 includes a ticket transmission unit 132, and a print-data transmission unit 134.

When an instruction of print processing from a user is received by a printer driver, the ticket transmission unit 132 transmits a ticket used for authentication to the management server 110, and the portable information terminal 170 used for authentication. A graphical user interface (GUI) can be disposed on a setting screen of the printer driver. This graphical user interface (GUI) can be used to select a portable information terminal used for user authentication from one or more portable information terminals registered in advance. A user can select or designate a portable information terminal to be used for user authentication using the setting screen of the printer driver. The above described functions of selecting a to-be-used portable information terminal, and transmitting a ticket including user information for identifying the selected portable information terminal to the management server 110 and the portable information terminal 170 can be provided, for example, by the printer driver.

The ticket issued by the information processing apparatus 130 includes user information and processing contents information. The user information indicates the portable information terminal 170 to be used for user authentication when conducting print processing. The processing contents information includes information for identifying processing to be conducted to the print data. The user information can be used as terminal identification information for identifying the portable information terminal 170 carried by a user. In this example embodiment, the terminal identification information is, for example, physical address such as media access control (MAC) address, and Internet Protocol (IP) address, but not limited to hereto. The processing contents information can include driver setting of the printer driver, and print execution time when print time is designated.

When an instruction of print processing is received from a user, the print-data transmission unit 134 transmits print data to a print server having a function of storing the print data. In this example embodiment, the management server 110 is used as the print server having a function of storing the print data. However, in other configuration, a print server having a function of storing the print data can be disposed as a server different from the management server 110, and the image processing apparatus 150 can have a function of storing the print data.

A description is given of the portable information terminal 170 used as a personal identification unit for user authentication. The portable information terminal 170 includes a ticket receiving unit 172, a positioning information obtaining unit 174, and an authentication information transmission unit 176.

When the portable information terminal 170 is designated as an apparatus used for authentication, the ticket receiving unit 172 receives a ticket including user information from the information processing apparatus 130, which is a requester of print processing.

The positioning information obtaining unit 174 includes the above mentioned positioning information receiving unit 60, and obtains positioning information of the portable information terminal 170 periodically, in which the positioning information obtaining unit 174 can function as a position information obtaining unit to obtain information of position of a portable terminal.

The authentication information transmission unit 176 transmits positioning information obtained by the positioning information obtaining unit 174, and the ticket including the received user information to the management server 110 periodically. The positioning information typically includes a latitude and a longitude indicating a position of the portable information terminal 170 in a given geographical coordinate system. Hereinafter, the positioning information and the ticket are collectively referred to as authentication information.

In a preferable configuration, obtaining of positioning information by the positioning information obtaining unit 174 and transmission of authentication information by the authentication information transmission unit 176 is not validated while the portable information terminal 170 does not receive a ticket from the information processing apparatus 130, which means when printing using a printer application is not conducted. The obtaining of positioning information by the positioning information obtaining unit 174 and transmission of authentication information by the authentication information transmission unit 176 are validated during a time period from the reception of a ticket by the ticket receiving unit 172 and removing the ticket after completing all of received print processing. Positioning processing requires a certain power consumption. By using a configuration that conducts positioning only when the ticket is being retained, power saving of the portable information terminal 170 can be devised.

A description is given of the management server 110 that manages use of the image processing apparatus 150. In an example embodiment, the management server 110 includes, for example, a ticket receiving unit 112, a print-data receiving unit 114, an authentication information receiving unit 116, a data management unit 118, a terminal distance determination unit 120, a user authentication unit 122, an authentication result transmission unit 124, and a print-data transmission unit 126.

When a user requests a print processing, the ticket receiving unit 112 receives the ticket including the above mentioned user information from the information processing apparatus 130, which is a requester of print processing, in which the ticket receiving unit 112 can function as a receiving unit to receive the ticket including the user information. When the user requests print processing, the print-data receiving unit 114 receives the print data from the information processing apparatus 130, which is a requester of print processing.

The data management unit 118 stores position information of each of the image processing apparatuses 150A and 150B used as management target apparatus 160, and manages the position information included in a database, in which the data management unit 118 can function as a position storing unit. FIG. 4A is an example of data structure of an image processing apparatus management table used for managing position information of image processing apparatuses. As illustrated in FIG. 4A, the image processing apparatus management table includes information of each of image processing apparatuses such as name, physical address, IP address, position information where an apparatus is placed, and available driver information of each of image processing apparatuses, in which the data management unit 118 can function as a first storage unit to store position information of one or more image processing apparatuses.

Further, the image processing apparatus 150 can include a receiving unit that receives positioning information, and the management server 110 can receive the positioning information of the image processing apparatus 150 from the receiving unit and register the positioning information.

Further, a mobile terminal having a camera that can receive positioning information can be used to register position information of the image processing apparatus 150. Specifically, the mobile terminal captures the image processing apparatus 150, and then position information of the image processing apparatus 150 can be computed based on positioning information of the mobile terminal, direction to the image processing apparatus 150 at the captured time, distance to the image processing apparatus 150 from the mobile terminal. The computed position information of the image processing apparatus 150 can be registered to the management server 110. These information is defined by image file format standard for digital still camera such as exchangeable image file format (Exif) set by Japan Electronics and Information Technology Industries Association (JEITA). A registration method of the image processing apparatus 150 by capturing the image processing apparatus 150 may be preferable when the image processing apparatus 150 does not have capability to receive positioning information.

Further, the data management unit 118 stores a ticket of print processing requested from the information processing apparatus 130, and manages the ticket information included in the database. FIG. 4B is an example of data structure of a print processing management table used for managing print processing. As illustrated in FIG. 4B, the print processing management table manages information of the portable information terminal 170 used for authentication such as physical address, IP address, driver setting information identifying process contents, and print data of the portable information terminal 170 by correlating these information, in which the data management unit 118 can function as a second storage unit to store user information indicating a portable terminal used for authentication when conducting a target process requested by the requester.

The authentication information receiving unit 116 periodically receives authentication information from the portable information terminal 170 having a ticket. When the authentication information receiving unit 116 receives the authentication information, the authentication information receiving unit 116 reports the authentication information to the terminal distance determination unit 120.

As to the ticket received from the information processing apparatus 130 when print processing is requested, the terminal distance determination unit 120 computes and determines distance between apparatuses based on positioning information of the portable information terminal 170, received from the portable information terminal 170 having the same ticket, and position information of each of the image processing apparatuses 150 stored in the data management unit 118. Specifically, the terminal distance determination unit 120 determines distance between the portable information terminal 170 and the image processing apparatuses 150 based on proximity determination condition, in which the terminal distance determination unit 120 determines whether the computed distance becomes a threshold value or less that initiates or triggers the user authentication processing (i.e., an event of initiating the authentication processing), wherein the threshold value is used as the proximity determination condition.

When the terminal distance determination unit 120 determines that the proximity determination condition is satisfied, the user authentication unit 122 is called, and the user authentication processing is started, in which the user authentication unit 122 can function as an authentication unit that conducts the user authentication processing. For example, a distance of 0.1 meter from an image processing apparatus can be set as the threshold value. In this case, when a user carrying the portable information terminal 170 enters an area of 0.1 meter or less from the image processing apparatus, the user authentication is started. A system administrator can set the threshold value, and the threshold value can be a fixed value.

When the computed distance satisfies the proximity determination condition in the above mentioned determination, the user authentication unit 122 cross-checks user information of the ticket received from the requester of the print processing, and user information of the ticket received from the portable information terminal 170 that satisfies the above mentioned proximity determination condition to conduct the user authentication processing.

Further, in the user authentication processing, the user authentication unit 122 also cross-checks the processing contents information included in the ticket received from the requester of the print processing, and the processing contents information included in the ticket received from the portable information terminal 170. A result of the user authentication processing is transferred from the user authentication unit 122 to the authentication result transmission unit 124.

In the described example embodiment, for the sake of simplicity of description, it is assumed that authentication is granted when the user authentication information is matched and the processing contents information is matched. However, other configurations can be employed. For example, available-for-use one or more image processing apparatuses, available-for-use one or more functions (e.g., limit of available for use functions, limit of available for use color modes) can be registered in advance for a single user, a group that a plurality of users belong, and a role assigned to a user, and these authorization information can be included in the authentication result. To manage such user information collectively, the management server 110 can be linked to an external authentication server such as a lightweight directory access protocol (LADP) server.

When a user carrying the portable information terminal 170 is authenticated by the user authentication unit 122, the authentication result transmission unit 124 transmits the ticket as an authentication result to an image processing apparatus 150, which exists at a position near the concerned portable information terminal 170. The transmission of the ticket indicates a condition that the portable information terminal 170, authenticated for the user authentication, exists near the image processing apparatus 150, which is a destination of data, and the transmission of the ticket instructs the image processing apparatus 150 to accept the user authentication and to display a screen image displayable after confirming the user authentication.

Further, the print-data transmission unit 126 transmits the print data to the image processing apparatus 150. The print data can be transmitted with the ticket, or the print data can be transmitted to the image processing apparatus 150 after the image processing apparatus 150 that has received the ticket displays a screen after confirming the user authentication, and then receives a selection of target print data and an instruction of print execution from a user.

A description is given of the image processing apparatus 150. A use of the image processing apparatus 150 is managed by the management server 110. The image processing apparatus 150A that receives the ticket accepts user authentication, and can display, for example, a screen after log in and a list of print processing, which can be conducted, on the operation panel 38. The image processing apparatus 150A includes, for example, a data receiving unit 152A, a print processing unit 156A, and a display unit 154A.

The data receiving unit 152 receives the ticket from the management server 110 as an authentication result that the portable information terminal 170 exists near the image processing apparatus 150A. When the user authentication is completed, the display unit 154A displays a screen displayable upon completing the user authentication. For example, based on the received ticket, the display unit 154A displays a list of print processing, and details of print processing. The details and list may include, for example, file name, extension, date, time, file size, number of prints, process contents, number of pages, and thumbnail of preview.

In a configuration of FIG. 3, the image processing apparatus 150A is used as an image processing apparatus having the display unit 154A, and the image processing apparatus 150B is used as an image processing apparatus not having a display capability or function. The image processing apparatus 150A having the display unit 154A can display a list of print processing, with which a user can select print processing from the list and output the selected print processing. As to the image processing apparatus 150B not having sufficient display capability or function, the image processing apparatus 150B can output, for example, all of print processing related to one user in response to an operation of a hard key by a user.

In the above described configuration, the management server 110 is configured as one single general computer, but a configuration of the management server 110 is not limited hereto. For example, the management server 110 can be devised using a plurality of dispersed computers that configure the above described authentication management function. Further, the above mentioned computer is not limited to a computer independent from the information processing apparatus 130, the image processing apparatus 150, and the portable information terminal 170. For example, a part or entire of the above described functions provided to the management server 110 can be installed to a computer configuring the image processing apparatus 150.

(Flow of Process)

Figure 6:
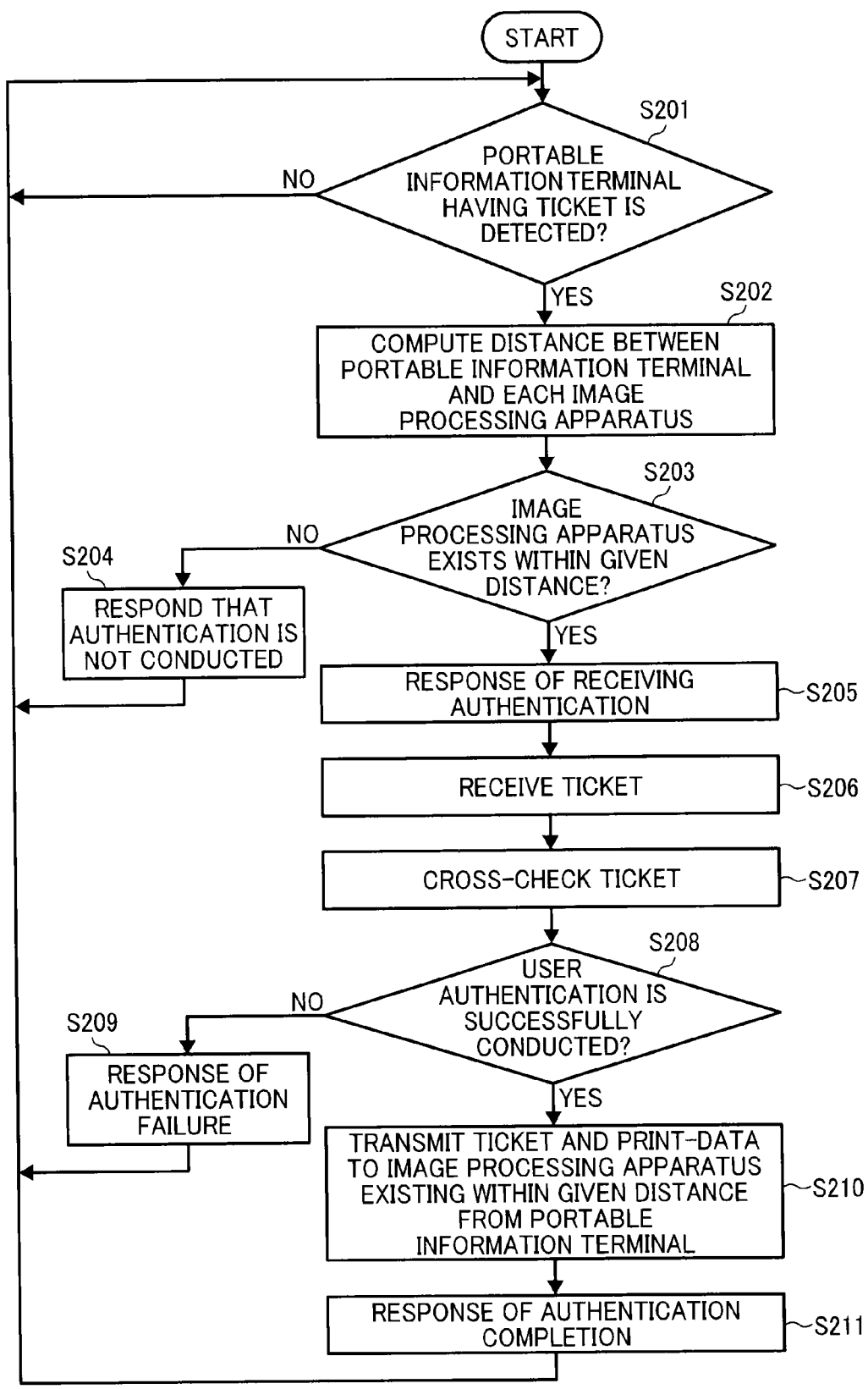
FIG. 6 is a flowchart showing the steps of user authentication processing conducted by the management server according to an example embodiment.

A description is given of user authentication processing with reference to FIGS. 5 and 6 according to an example embodiment. FIG. 5 is a sequential chart of showing the steps of user authentication processing conducted by the user authentication management system 100. The process illustrated in FIG. 5 can be started from step S100 when a user operates the information processing apparatus 130 to instruct print processing using a printer driver.

At step S101, the information processing apparatus 130 transmits a ticket and print data to the management server 110. At step S102, the management server 110 registers the ticket and the print data to the print processing management table in the data management unit 118, and returns a response to the information processing apparatus 130.

At step S103, the information processing apparatus 130 transmits the ticket to the portable information terminal 170 designated or selected by a user. At step S104, the portable information terminal 170 stores the received ticket, and the CPU 52 of the portable information terminal 170 validates a control of obtaining of positioning information by the positioning information obtaining unit 174, and returns a response to the information processing apparatus 130, in which the CPU 52 can function as a validation unit to validate the positioning information obtaining unit 174 when the user information is received from the requester. After step S104, positioning information is obtained periodically.

When the positioning information obtaining unit 174 obtains positioning information at step S105, at step S106, the portable information terminal 170 transmits the positioning information to the management server 110 with the stored ticket. The management server 110, which receives the positioning information and the ticket, detects the portable information terminal 170 having the ticket at step S107.

At step S108, the management server 110 determines distance between each of the apparatuses based on the positioning information from the portable information terminal 170, and the position information of each of the image processing apparatuses 150 stored in the image processing apparatus management table of the data management unit 118, and returns a response to the portable information terminal 170. In this case, for the sake of description, it is assumed that the image processing apparatus 150 existing at a distance of a given threshold value or less from the portable information terminal 170 is detected, and therefore user authentication can be proceeded.

Upon receiving a response indicating a start of the user authentication, at step S109, the portable information terminal 170 transmits the ticket to the management server 110.

At step S110, the management server 110 cross-checks the ticket received from the portable information terminal 170, and the ticket received from the information processing apparatus 130 at step S101 and registered to conduct the user authentication, and returns a response to the portable information terminal 170. In this case, for the sake of description, it is assumed that the portable information terminal 170 is authenticated for the user authentication (i.e., user authentication is affirmed).

At step S111, the management server 110 transmits the ticket and the print data as an authentication result to the image processing apparatus 150 existing at a distance of a given threshold value or less with respect to the portable information terminal 170.

At step S112, the image processing apparatus 150 accepts the user authentication, and displays a screen displayable upon confirming the user authentication such as a screen of list of print processing related to the user.

FIG. 6 is a flowchart showing the steps of user authentication processing conductable by using the management server 110 according to an example embodiment. The process illustrated in FIG. 6 starts in response to an activation of the management server 110.

At step S201, the management server 110 determines whether the portable information terminal 170 having a ticket is detected. If the portable information terminal 170 having the ticket exists, authentication information is received by the management server 110 periodically. Therefore, the management server 110 can determine whether the portable information terminal 170 having the ticket is detected by determining whether the management server 110 receives the authentication information.

When the management server 110 determines that the portable information terminal 170 having the ticket does not exist (S201: No), the management server 110 loops the process to step S201, and waits until detecting a portable information terminal having a ticket. By contrast, when the management server 110 determines that the portable information terminal 170 having the ticket exists (S201: Yes), the process proceeds to step S202.

At step S202, the management server 110 computes distance between the portable information terminal 170 that has transmitted the authentication information to the management server 110, and each of the image processing apparatuses 150.

At step S203, the management server 110 determines whether an image processing apparatus exists within an given area from the portable information terminal 170, wherein the given area can be set by a given threshold distance value from the portable information terminal 170.

When the management server 110 determines that an image processing apparatus does not exist within the given area from the portable information terminal 170 (S203: No), at step S204, the management server 110 returns a response to the portable information terminal 170 that authentication is not conducted, and loops the process to step S201. By contrast, when the management server 110 determines that the image processing apparatus exists within the given area from the portable information terminal 170 (S203: Yes), the process proceeds to step S205.

At step S205, the management server 110 returns a response accepting the user authentication to the portable information terminal 170. Upon receiving the response, the portable information terminal 170 transmits the ticket to the management server 110. At step S206, the management server 110 receives the ticket from the portable information terminal 170. At step S207, the management server 110 cross-checks the ticket received from the portable information terminal 170, and the ticket stored in the image processing apparatus management table.

At step S208, the management server 110 determines whether user authentication is successfully conducted, and determines a process after step S208 based on a result at step S208. When the management server 110 determines that the compared tickets are not matched, and thereby user authentication is not successfully conducted (S208: No), at step S209, the management server 110 reports a response of authentication failure. The portable information terminal 170 that receives the response of authentication failure reports an error notice to a user, as required.

By contrast, when the management server 110 determines that user authentication is successfully conducted (S208: Yes), the process proceeds to step S210. At step S210, the management server 110 transmits the ticket and the print data as an authentication result to the image processing apparatus 150 existing within the given area from the portable information terminal 170. At step S211, the management server 110 reports a response of authentication completion to the portable information terminal 170, and loops the process to step S201, and waits next authentication information.

In the above described example embodiment, in an environment that a plurality of users share one or more image processing apparatuses, user authentication can be started based on positioning information of a portable information terminal carried by a user.

If a user carrying a portable information terminal not having a ticket enters in an area of a given distance or less from the image processing apparatus, the user authentication is not conducted. By contrast, if a user carrying a portable information terminal having a ticket enters in an area of a given distance or less from the image processing apparatus, the user authentication is conducted. Therefore, if a user such as an authentic person who has requested print processing approaches near a desired image processing apparatus, the user authentication is conducted automatically, and the desired image processing apparatus can be used by the user, in which the user is not required to take an action such as passing over or touching the portable information terminal.

Other Example Embodiment

Figure 7A:
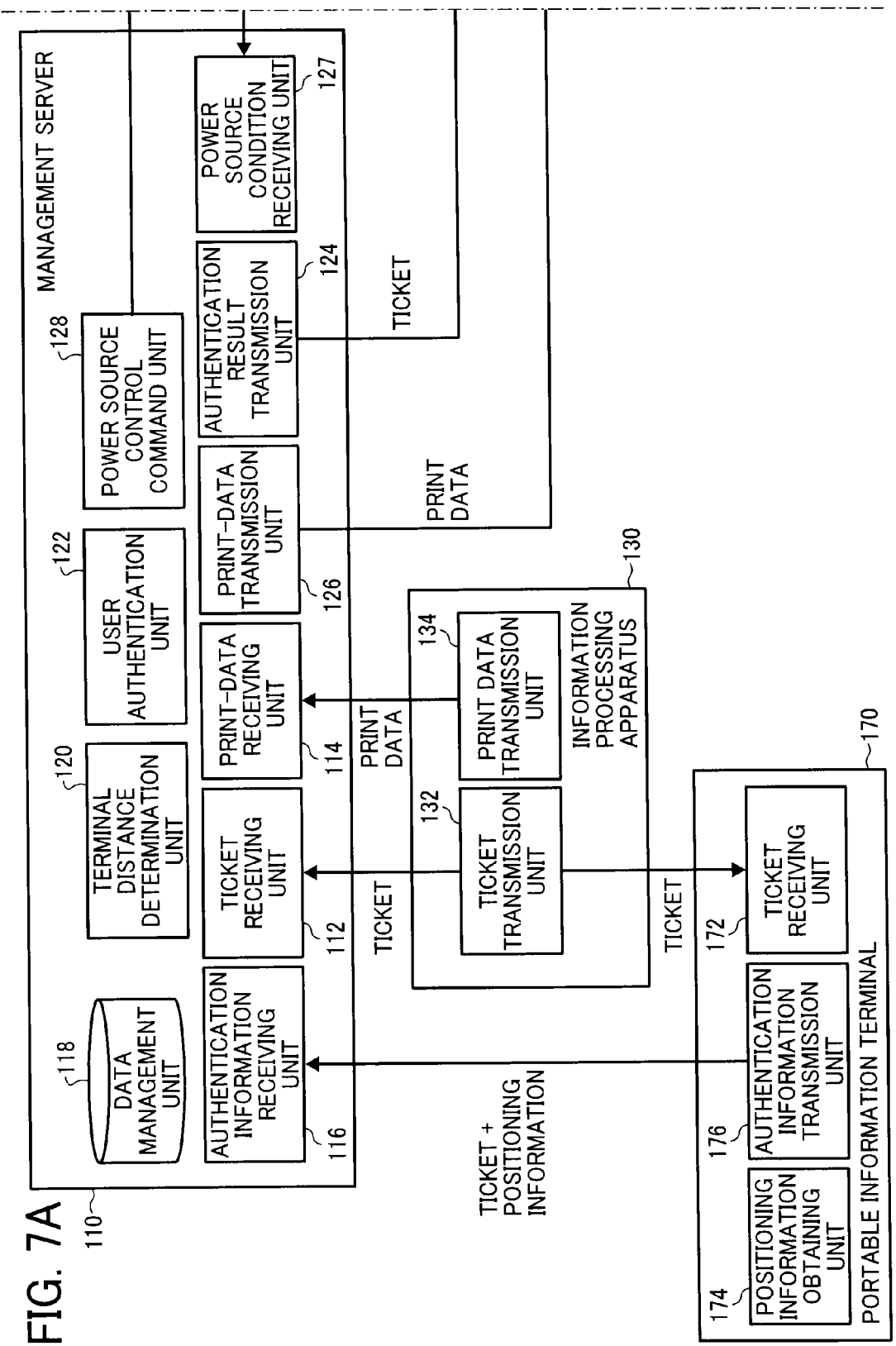
FIGS. 7A and 7B are a functional block diagram of a user authentication management system according to other example embodiment.
Figure 9:
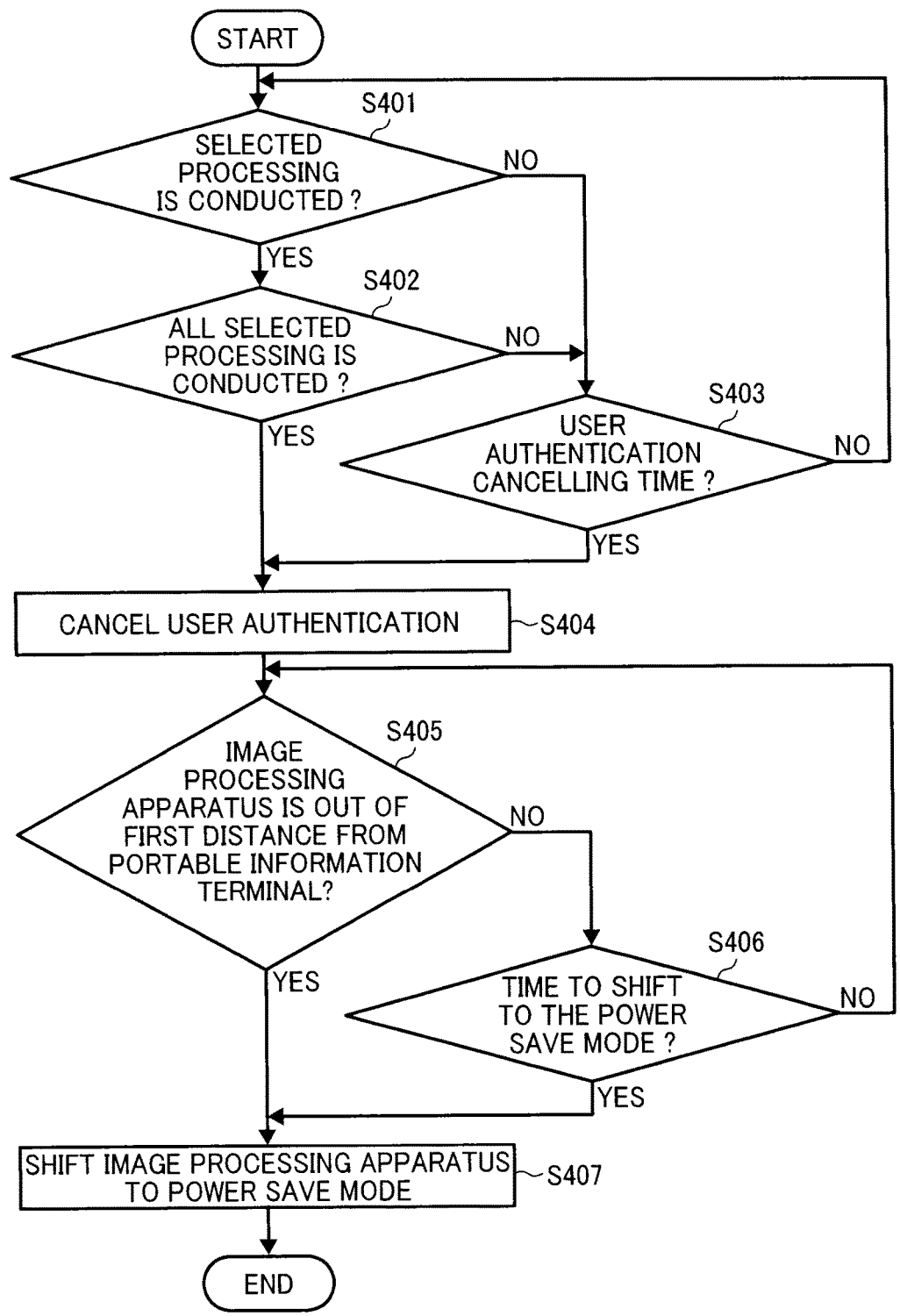
FIG. 9 is a flowchart showing the steps of user authentication cancel processing and power control after confirming user authentication conducted by a management server according to other example embodiment.

A description is given of user authentication management system according to other example embodiment with reference to FIGS. 7A/7B, 8A/8B, and FIG. 9. Because the following other example embodiment have similar functions of the above described example embodiment described with reference to FIGS. 1 to 6, a description is given of different points. Further, the parts and functional units that are the same as the above described example embodiments described with reference to FIGS. 1 to 6 are assigned with the same name and the same references.

Figure 7B:
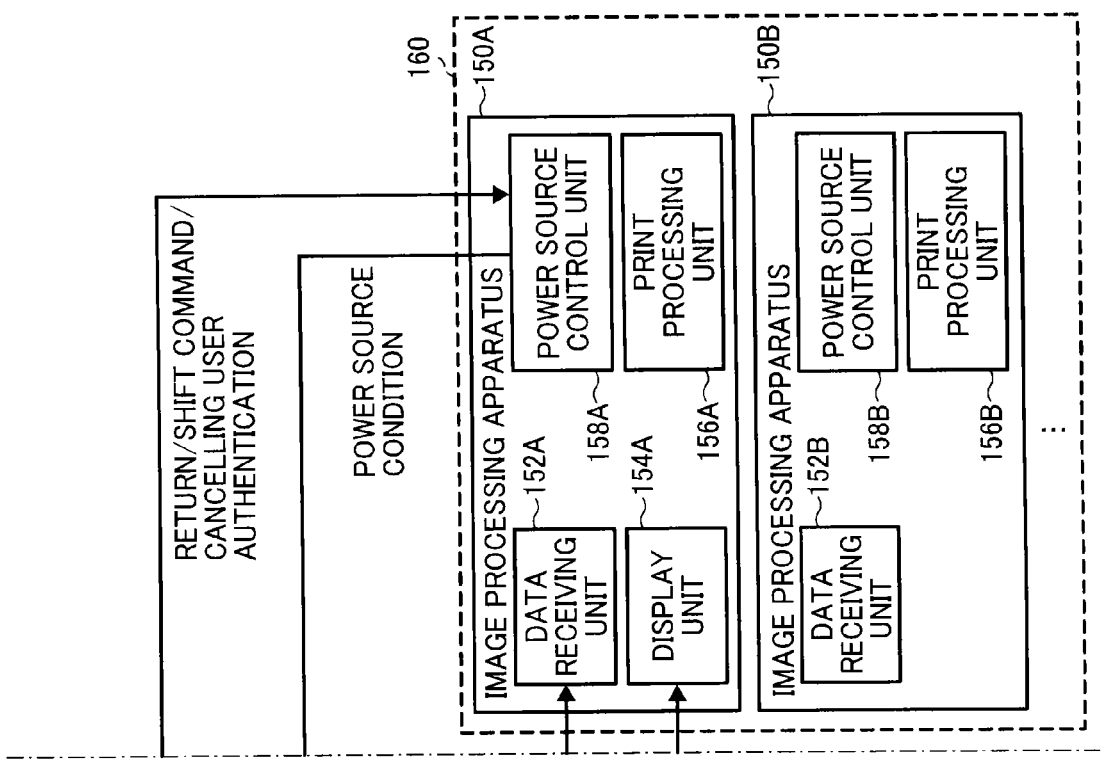

FIGS. 7A and 7B are functional block diagram of the user authentication management system 100 according to other example embodiment. Similar to FIG. 3, FIGS. 7A and 7B shows components 112 to 128 operated on the management server 110, components 132 and 34 operated on the information processing apparatus 130, components 152 to 158 operated on the image processing apparatus 150, and components 172 to 176 operated on the portable information terminal 170.

As to other example embodiment illustrated in FIGS. 7A and 7B, the management server 110 includes the ticket receiving unit 112, the print-data receiving unit 114, the authentication information receiving unit 116, the data management unit 118, the terminal distance determination unit 120, the user authentication unit 122, the authentication result transmission unit 124, the print-data transmission unit 126, and further a power source condition receiving unit 127, and a power source control command unit 128.

As to other example embodiment illustrated in FIGS. 7A and 7B, the image processing apparatus 150 includes the data receiving unit 152, the print processing unit 156, the display unit 154, and further a power source control unit 158. The information processing apparatus 130 and the portable information terminal 170 have the same configuration illustrated in FIGS. 1 to 6.

The power source condition receiving unit 127 of the management server 110 receives a notice of state or condition of power source of the image processing apparatus 150 from the image processing apparatus 150 periodically, in which the power source condition receiving unit 127 can function as a power source condition determination unit to determine the power source condition of the image processing apparatus 150. As to other example embodiment illustrated in FIGS. 7A and 7B, the terminal distance determination unit 120 can determine whether distance computed from positioning information satisfies the proximity determination condition, in which the terminal distance determination unit 120 can function as a proximity determination unit, and the terminal distance determination unit 120 can determine whether the distance computed from positioning information becomes a threshold value or less, which is used as a trigger or event of initiating a return to the standby mode, in which the terminal distance determination unit 120 can function as a return determination unit.

In a further preferable configuration, when the distance computed from positioning information exceeds a threshold value, the computed distance can be used as a trigger or initiator to re-shift the image processing apparatus 150 to the power save mode after the image processing apparatus 150 returns to the standby mode, in which the terminal distance determination unit 120 can function as a shift determination unit that determines whether the computed distance exceeds the threshold value.

When it is determined that a return determination condition is satisfied, the power source control command unit 128 is called, and the return processing from the power save mode is started, in which the power source control command unit 128 can function as a return command unit to instruct an image processing apparatus at a power save mode to return to a standby mode when the distance becomes the threshold value or less.

When it is determined that a re-shifting determination condition is satisfied, the power source control command unit 128 is called, and the re-shifting processing to the power save mode is started, in which the power source control command unit 128 can function as a shift command unit to instruct an image processing apparatus having the distance exceeding the threshold value to shift to a power save mode.

The threshold value of distance set for the return determination condition and re-shifting determination condition can be set greater than the threshold value set for the above described proximity determination condition. For example, the threshold value of distance set for the return determination condition and the re-shifting determination condition can be set to a two-meter distance from the image processing apparatus. In this example case, when a user carrying the portable information terminal 170 enters an area of two-meter distance from the image processing apparatus, the image processing apparatus at the power save mode returns to other mode such as a standby mode.

By contrast, when a user carrying the portable information terminal 170 leaves an area of two-meter distance from the image processing apparatus, the image processing apparatus at the standby mode re-shifts to the power save mode if no other portable information terminal of other user exists.

The threshold value of distance set for the return determination condition and re-shifting determination condition can be the same value or different values, in which a system administrator can set the threshold value, and the threshold value can be a fixed value. Further, by obtaining moving speed of a user based on positioning information, the threshold value can be set dynamically using the following formula (1).

Threshold value of distance=User moving speed× Time required from power save mode to print ready mode (1)

When the computed distance satisfies the return determination condition in the above mentioned determination process, the power source control command unit 128 of the management server 110 checks the latest state or condition of power source of the image processing apparatus 150 received by the power source condition receiving unit 127. If the image processing apparatus 150 is at the power save mode, the power source control command unit 128 instructs the image processing apparatus 150 to return to the standby mode.

When the computed distance satisfies the re-shifting determination condition in the above mentioned determination process, the power source control command unit 128 checks the latest state or condition of power source of the image processing apparatus 150, and if the image processing apparatus 150 is at the standby mode, the power source control command unit 128 instructs the image processing apparatus 150 to shift to the power save mode.

The power source control unit 158 of the image processing apparatus 150 transmits the state or condition of power source of the image processing apparatus 150 to the management server 110 periodically, and changes state or condition of power source of the image processing apparatus 150 based on an instruction from the management server 110. When receiving a return command from the management server 110, the image processing apparatus 150 conducts a control to return to the standby mode from the power save mode. When receiving a re-shift command from the management server 110, the image processing apparatus 150 conducts a control to shift to the power save mode from the standby mode.

In the described example embodiment, the state or condition of power source settable to the image processing apparatus are two modes such as the power save mode and standby mode, but the number of states or conditions of power source settable to the image processing apparatus is not limited any specific numbers.

In other configuration, a plurality of power save modes having different levels of power supply can be set. For example, a first power save mode that turns off power supply to an operation panel while supplying power to others, a second power save mode that turns off power supply to an operation panel and an output unit while supplying power to others, and a third power save mode that turns off power supply to all units can be set. The threshold value of distance can be set to each of the modes, with which a return control can be conducted with multiple levels.

Further, as to the user authentication unit 122 of other example embodiment, when all of print processing related to the portable information terminal 170 used for the user authentication are conducted and completed, or when a given allowable authentication maintaining time elapses after confirming the authentication, the user authentication unit 122 can cancel authentication condition set by completing the user authentication. The user authentication unit 122 can issue an instruction for cancelling authentication condition set by the user authentication processing to the image processing apparatus 150 to cancel the user authentication condition, in which the user authentication unit 122 can function as a cancelling unit to cancel the authentication condition.

Figure 8A:
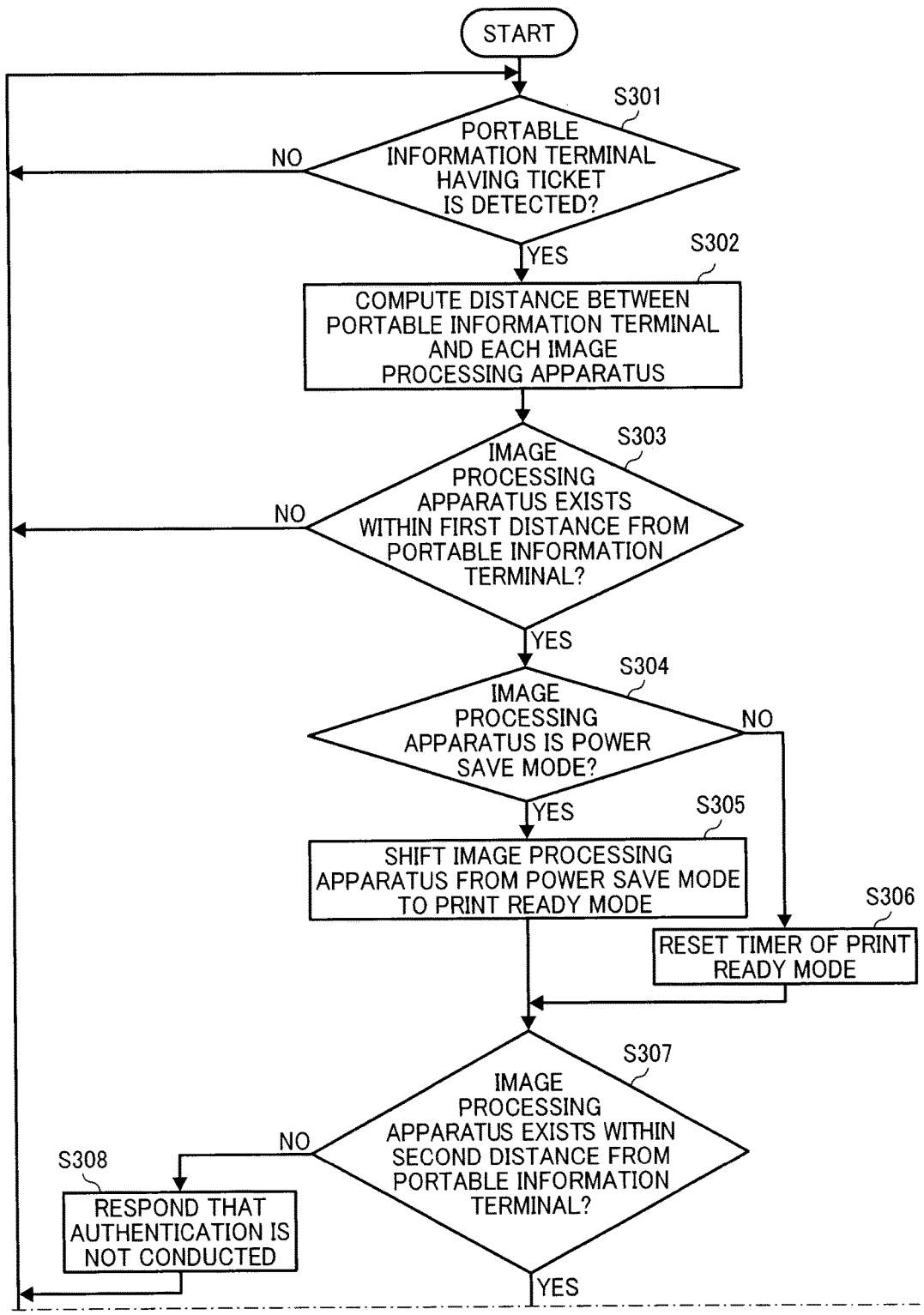
FIGS. 8A and 8B are a flowchart showing the steps of user authentication processing and power source control conducted by a management server according to other example embodiment.
Figure 8B:
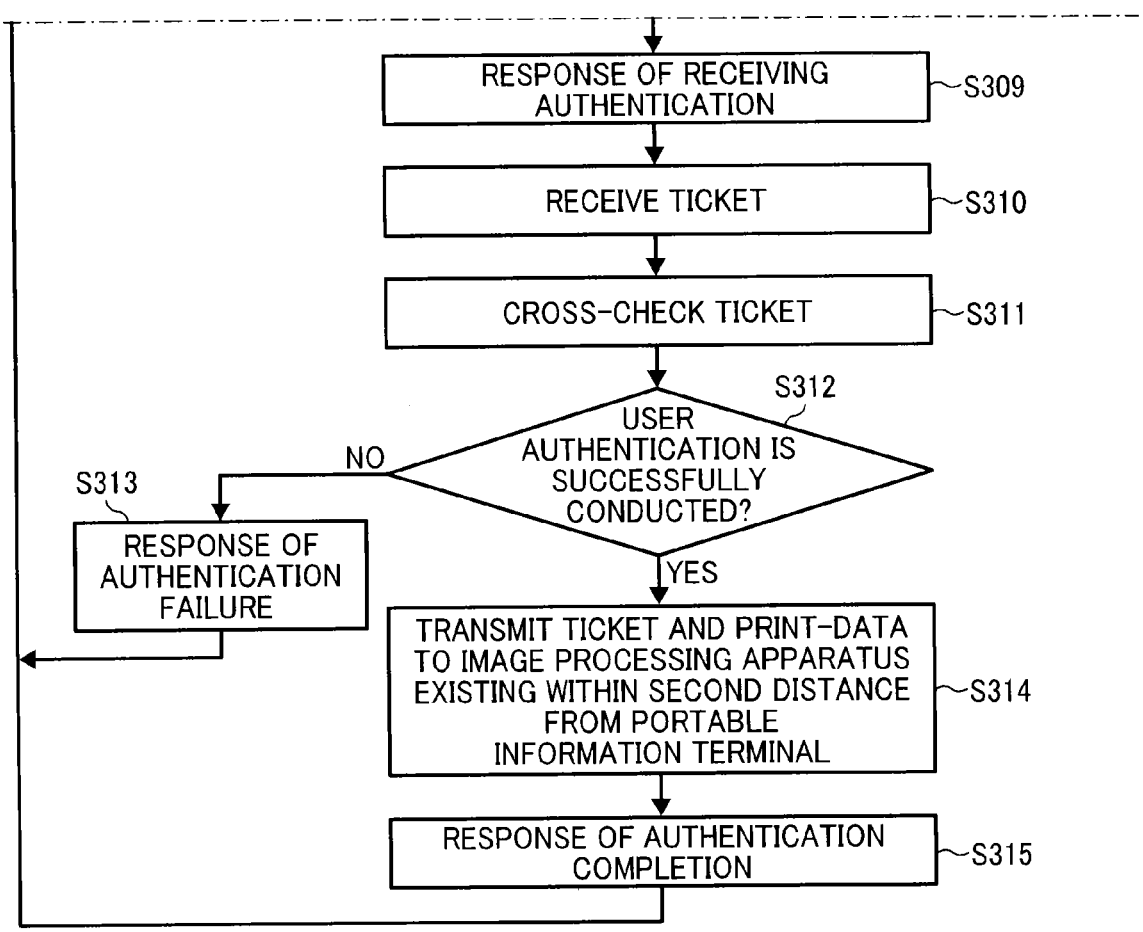

FIGS. 8A and 8B are a flowchart showing the steps of user authentication processing and power source control conduct-able by using the management server 110 of other example embodiment. The process illustrated in FIGS. 8A and 8B starts in response to an activation of the management server 110.

At step S301, the management server 110 determines whether the portable information terminal 170 having a ticket is detected. When the management server 110 determines that a portable information terminal having a ticket is not detected (S301: No), the management server 110 loops the process to step S301. By contrast, when the management server 110 determines that the portable information terminal 170 having the ticket is detected (S301: Yes), the process proceeds to the step S302.

At step S302, the management server 110 computes distance between the portable information terminal 170 that has transmitted the authentication information, and each of the image processing apparatuses 150.

At step S303, the management server 110 determines whether an image processing apparatus exists within a distance of a first threshold value, which is used as a return determination condition, from the portable information terminal 170. When it is determined that no image processing apparatus exists within the distance of the first threshold value (S303: No), the management server 110 loops the process to step S301. By contrast, when it is determined that an image processing apparatus exists within the distance of the first threshold value (S303: Yes), the process proceeds to step S304.

Further, at step S304, the management server 110 determines whether the image processing apparatus existing within the distance of the first threshold value is at the power save mode. The state or condition of power source of the image processing apparatus can be determined based on a notice from the image processing apparatus. For example, if the operation panel is being supplied with power, it can be determined that the image processing apparatus is at the print ready mode or standby mode, and if the operation panel is not being supplied with power, it can be determined that the image processing apparatus is at the power save mode.

When it is determined that the image processing apparatus is at the power save mode (S304: Yes), at step S305, the image processing apparatus is shifted from the power save mode to the standby mode (or print ready mode), and the process proceeds to step S307. By contrast, when it is determined that the image processing apparatus is not at the power save mode (S304: No), at step S306, a timer of print ready mode of the image processing apparatus, which is a timer that counts time for initiating a shift to the power save mode, is rest, and the process proceeds to step S307, with which the timer is reset, and time until shifting to the power save mode can be extended.

At step S307, the management server 110 determines whether the image processing apparatus, which is already determined existing within the distance of the first threshold value, further exists within a distance of a second threshold value from the portable information terminal 170. When the management server 110 determines that the image processing apparatus does not exist within the distance of the second threshold value (S307: No), at step S308, the management server 110 transmits a response indicating that authentication is not conducted to the portable information terminal 170, and loops the process to step S301. By contrast, when it is determined that the image processing apparatus exists within the distance of the second threshold value (S307: Yes), the management server 110 proceeds the process to step S309. After step S309, the user authentication processing is conducted, which is the same flow of steps S205 to S211 illustrated in FIG. 6, and thereby the explanation is omitted.

FIG. 9 is a flowchart showing the steps of user authentication cancel processing and power source control after confirming the user authentication conduct-able by the management server 110 of other example embodiment. The process illustrated in FIG. 9 starts after displaying a screen displayable after log in at step S112 described with reference to FIG. 5.

At step S401, the management server 110 determines whether the image processing apparatus 150, which has received the ticket from the management server 110 and is instructed that a user authentication is completed from the management server 110, conducts print processing based on selection.

As to the image processing apparatus 150, when print processing corresponding to the received ticket is conducted based on a user instruction, the image processing apparatus 150 reports an execution completion of print processing to the management server 110. Therefore, at step S401, the management server 110 can determine whether the image processing apparatus 150 conducts selected print processing by detecting whether the management server 110 receives a report of execution completion from the image processing apparatus 150.

When it is determined that the selected print processing is conducted (S401: Yes), the process proceeds to step S402. At step S402, the management server 110 further determines whether all of selected print processing related to a user (i.e., portable information terminal) authenticated by the authentication processing are conducted. When it is determined that all of selected print processing are not yet conducted (S402: No), the process proceeds to step S403. Further, when it is determined that a selected print processing is not yet conducted (S401: No), the process also proceeds to step S403.

At step S403, the management server 110 determines whether a given authentication cancelling time elapses after confirming the user authentication. For example, the management server 110 can be provided with a timer that counts elapsing time after confirming the user authentication to determine whether the timer counts up the elapsing time.

Further, a timer can be provided to the image processing apparatus 150, in which the management server 110 can determine whether a given authentication cancelling time elapses by detecting whether a notice indicating elapsing of authentication cancelling time is received from the image processing apparatus 150. A system administrator can set the authentication cancelling time, and the authentication cancelling time can be a fixed value.

When the management server 110 determines that authentication cancelling time does not yet elapse (S403: No), the management server 110 loops the process to step S401, and repeats the process until the authentication cancelling time elapses or all of selected print processing are completed. When the management server 110 determines that the authentication cancelling time elapses (S403: Yes), the process proceeds to step S404. Further, when the management server 110 determines that all of selected print processing are conducted and completed (S402: Yes), the process also proceeds to step S404.

At step S404, the management server 110 uses the power source control command unit 128 to instruct the image processing apparatus 150 to cancel the user authentication condition.

At step S405, the management server 110 determines whether the image processing apparatus still exists within the distance of the first threshold value from a portable information terminal having a ticket such as a portable information terminal having a ticket carried by other user. When the management server 110 determines that no image processing apparatus exists within the distance of the first threshold value (S405: Yes), which means the image processing apparatus is out of the first distance from the portable information terminal, at step S407, the management server 110 uses the power source control command unit 128 to shift the concerned image processing apparatus to the power save mode, and ends the process.

By contrast, when the management server 110 determines that an image processing apparatus exists within the distance of the first threshold value (S405: No), which means the image processing apparatus is not out of the first distance from the portable information terminal, the process proceeds to step S406.

At step S406, the management server 110 further determines whether time to shift to the power save mode elapses. For example, the management server 110 can be provided with a timer that counts time after the return to the standby mode to determine whether the timer counts up the elapsing time. Further, a timer can be provided to the image processing apparatus 150, in which the management server 110 can determine whether a notice indicating elapsing of the standby time is received from the image processing apparatus 150. A system administrator can set the standby time defining the re-shift timing, and the standby time can be a fixed value.

When the management server 110 determines that allowable standby time elapses (S406: Yes), at step S407, the management server 110 uses the power source control command unit 128 to shift the image processing apparatus 150 to the power save mode, and ends the process.

As to the above described example embodiments, based on positioning information of a portable information terminal carried by a user, an image processing apparatus can be returned from the power save mode to the print ready mode or the standby mode. When a user carrying a portable information terminal not having a ticket enters an area of given distance from an image processing apparatus, an image processing apparatus is not returned from the power save mode to the print ready mode. By contrast, when a user carrying a portable information terminal having a ticket enters an area of given distance from an image processing apparatus, the image processing apparatus is returned to the print ready mode from the power save mode, and when the user further approaches and enters an area of a given distance from the image processing apparatus, the user authentication is conducted. Therefore, the user can conduct the user authentication and the subsequent print processing based on selection smoothly and automatically.

Further, based on positioning information, when a user carrying a portable information terminal having a ticket leaves from the image processing apparatus, the image processing apparatus can be re-shifted to the power save mode, with which power saving of the image processing apparatus can be enhanced.

Further, because the user authentication can be cancelled for a user that has completed all of print processing, and for a user that a given time elapses after confirming the user authentication, a situation that unauthorized person, other than an authentic user, using the image processing apparatus can be prevented.

As to the above described example embodiments, the authentication management system, authentication management apparatus, authentication method and program can start authentication processing conveniently based on position of a portable terminal carried by a user in an environment that a plurality of processing apparatuses are shared and used by a plurality of users.

As to the above described example embodiments, a management target using user authentication is an image processing apparatus and its print function, but can be other functions such as copy function, scanning function, facsimile function. As to the above described example embodiments, the image processing apparatus is used as an example of processing apparatus, but not limited hereto. For example, the above described example embodiments can be applied to processing apparatuses having various functions.

As to the above described the above described authentication management system, authentication management apparatus, authentication method, and a storage medium such as a memory of program of authentication method, in an environment using one or more processing apparatuses by a plurality of users, authentication processing can be started conveniently based on position of a portable terminal carried by a user.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a Wireless Application Protocol (WAP) or 3G-compliant phone) and so on. Since the present invention can be implemented as software, each and every aspect of the present invention thus encompasses computer software implementable on a programmable device.

The computer software can be provided to the programmable device using any storage medium or carrier medium for storing processor-readable code such as a floppy disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a Blu-ray disk, a SD card, a mini disk (MD), a magneto optical disc (MO), magnetic tape, a hard disk in a server, a solid state memory device or the like, but not limited these.

The hardware platform includes any desired kind of hardware resources including, for example, a central processing unit (CPU), a random access memory (RAM), and a hard disk drive (HDD). The CPU may be implemented by any desired kind of any desired number of processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, workstation) may control an information processing apparatus or an image processing apparatus such as image forming apparatus using a computer-readable program, which can execute the above-described processes or steps. In the above-described embodiments, at least one or more of the units of apparatus can be implemented as hardware or as a combination of hardware/software combination. Each of the functions of the described embodiments may be implemented by one or more processing circuits. A processing circuit includes a programmed processor, as a processor includes circuitry. A processing circuit also includes devices such as an application specific integrated circuit (ASIC) and conventional circuit components arranged to perform the recited functions.

Numerous additional modifications and variations are possible in light of the above teachings. It is therefore to be understood that, within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An authentication management system for managing use of a processing apparatus by a user, the authentication management system comprising;
   an authentication management apparatus including
   a memory to store position information of the processing apparatus;
   a receiver to receive, from a requester device, first user information that identifies a portable terminal to be used for authenticating the user, when the user requests the processing apparatus, via the requester device, to perform a target process, the requester device being different than the portable terminal; and
   processing circuitry to
   determine whether a distance between the portable terminal and the processing apparatus satisfies a proximity determination condition for determining proximity between the portable terminal and the processing apparatus, the distance being obtained based on position information of the portable terminal received from the portable terminal, and the position information of the processing apparatus, and
   receive second user information from the portable terminal and conduct authentication processing based on the first user information received from the requester device and the second user information received from the portable terminal, when the distance satisfies the proximity determination condition.

2. The authentication management system of claim 1, wherein the processing circuitry is further configured to:
   determine whether the distance reaches a first threshold value or less, the first threshold value being used as a trigger to initiate the authentication processing,
   determine whether the distance reaches a second threshold value or less, the second threshold value being used as a trigger to transition to a standby mode,
   determine a power condition of the processing apparatus, and
   instruct the processing apparatus to transition from a power save mode to a standby mode when the distance reaches the second threshold value or less, which is used as a trigger to return to the standby mode.

3. The authentication management system of claim 2, wherein the processing circuitry is further configured to determine whether the distance exceeds a third threshold value, which is used as a trigger to transition to a power save mode, and
 instruct the processing apparatus having the distance exceeding the third threshold value to transition to a power save mode.

4. The authentication management system of claim 1, wherein the processing circuitry is further configured to cancel an authentication condition that reflects the authentication processing when all of processing related to the portable terminal used for authentication are completed, or when allowable authentication maintaining time elapses after confirming authentication using the portable terminal.

5. The authentication management system of claim 1, further comprising the requester device, which is an information processing apparatus that transmits the first user information identifying the portable terminal, and processing contents information indicating processing contents to the authentication management apparatus and to the portable terminal,
 wherein, in the authentication processing, the processing contents information received from the information processing apparatus used as the requester of the target process, and processing contents information received from the portable terminal that satisfies the proximity determination condition are cross-checked.

6. The authentication management system of claim 5, wherein the portable terminal further includes:
 a position information receiver to receive information of a position of the portable terminal,
 circuitry configured to validate the received information of the position of the portable terminal when the first user information is received from the requester device, and
 a transmitter to transmit the received information of the position of the portable terminal and the received first user information to the authentication management apparatus.

7. The authentication management system of claim 5, wherein the processing apparatus is an image processing apparatus having a display, and
 wherein the authentication management apparatus further includes:
 a print-data receiver that receives print data for the target process from the requester device of the target process, and
 a print-data transmitter that transmits the print data to the image processing apparatus authenticated by the processing circuitry,
 wherein the display of the image processing apparatus receives the print data and displays the print data on the display.

8. An authentication management apparatus for managing use of a processing apparatus based on authentication using a portable terminal carriable by a user, the authentication management apparatus comprising:
 a first memory to store position information of the processing apparatus;
 a second memory to store first user information received from a requester device and indicating the portable terminal used for authentication when conducting a target process requested from the requester device, the requester device being different than the portable terminal; and
 processing circuitry configured to
 determine a distance between the portable terminal and the processing apparatus based on position information of the portable terminal received from the portable terminal, and position information of the processing apparatus, and
 receive second user information from the portable terminal and conduct authentication processing based on the first user information received from the requester device, and the second user information received from the portable terminal that satisfies a proximity determination condition, when the distance satisfies the proximity determination condition used for determining proximity.

9. An authentication method of managing use of a processing apparatus by a user, the method comprising:
 receiving, from a requester device, first user information that identifies a portable terminal to be used for authenticating the user when the user requests the processing apparatus, via the requester device, to perform a target process, the requester device being different than the portable terminal;
 obtaining a distance between the portable terminal and the processing apparatus based on position information of the portable terminal received from the portable terminal, and position information of the processing apparatus;
 determining whether the distance between the portable terminal and the processing apparatus satisfies a proximity determination condition; and
 receiving second user information from the portable terminal and conducting authentication processing based on the first user information received from the requester device and the second user information received from the portable terminal, when the distance satisfies the proximity determination condition used for determining proximity.

10. The authentication management system of claim 1, wherein the receiver is further configured to receive print data together with the first user information from the requester device.

11. The authentication management system of claim 1, further comprising a transmitter configured to transmit print data together with an authentication result to the processing apparatus when the authentication processing authenticates the user.

* * * * *